US009462556B2

United States Patent
Priel et al.

(10) Patent No.: US 9,462,556 B2
(45) Date of Patent: Oct. 4, 2016

(54) INTEGRATED CIRCUIT DEVICE, SIGNAL PROCESSING SYSTEM, ELECTRONIC DEVICE AND METHOD FOR CONFIGURING A SIGNAL PROCESSING OPERATING MODE

(75) Inventors: Michael Priel, Hertzelia (IL); Dan Kuzmin, Givat Shmuel (IL); Anton Rozen, Gedera (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 642 days.

(21) Appl. No.: 13/582,769

(22) PCT Filed: Mar. 22, 2010

(86) PCT No.: PCT/IB2010/051227
§ 371 (c)(1),
(2), (4) Date: Sep. 5, 2012

(87) PCT Pub. No.: WO2011/117669
PCT Pub. Date: Sep. 29, 2011

(65) Prior Publication Data
US 2013/0007431 A1  Jan. 3, 2013

(51) Int. Cl.
*G06F 9/00* (2006.01)
*G06F 1/32* (2006.01)
*H04W 52/02* (2009.01)

(52) U.S. Cl.
CPC ............ *H04W 52/0261* (2013.01); *G06F 1/32* (2013.01); *G06F 9/00* (2013.01); *Y02B 60/50* (2013.01)

(58) Field of Classification Search
CPC .. G06F 1/3203; G06F 1/3206; G06F 1/3234; G06F 1/32; G06F 9/00; H04W 52/0261; Y02B 60/50
See application file for complete search history.

(56) References Cited

U.S. PATENT DOCUMENTS

| | | | |
|---|---|---|---|
| 5,142,684 A * | 8/1992 | Perry et al. ................... | 713/320 |
| 6,141,762 A | 10/2000 | Nicol et al. | |
| 6,711,691 B1 | 3/2004 | Howard et al. | |
| 7,043,405 B2 | 5/2006 | Orenstien et al. | |
| 7,426,648 B2 | 9/2008 | Lint et al. | |
| 7,574,613 B2 | 8/2009 | Holle et al. | |
| 7,596,705 B2 | 9/2009 | Kim | |
| 7,925,900 B2 * | 4/2011 | Parks et al. ................... | 713/300 |
| 8,214,675 B2 * | 7/2012 | Challener et al. ............ | 713/324 |
| 8,336,010 B1 * | 12/2012 | Chang ................... | G06F 17/504 |
| | | | 716/108 |
| 2006/0036878 A1 | 2/2006 | Rothman et al. | |
| 2007/0136617 A1 * | 6/2007 | Kanno .................. | G06F 1/3203 |
| | | | 713/320 |
| 2008/0288796 A1 | 11/2008 | Nakamura et al. | |
| 2009/0085552 A1 | 4/2009 | Franza et al. | |
| 2009/0249094 A1 | 10/2009 | Marshall et al. | |

OTHER PUBLICATIONS

International Search Report and Written Opinion correlating to PCT/IB2010/051227 dated Dec. 9, 2010.

* cited by examiner

*Primary Examiner* — Thuan Du

(57) ABSTRACT

An integrated circuit device comprises a signal processing system having at least one first signal processing module fabricated by way of a first production process; and at least one second signal processing module fabricated by way of a second production process, wherein the second production process is different to the first production process. The signal processing system further comprises a signal processing management module arranged to: determine a desired system performance of the integrated circuit device; determine at least one operating condition of the signal processing system; and configure a signal processing operating mode of the signal processing system based at least partly on: the determined desired system performance; the at least one determined operating condition; and at least one of the first production process and the second production process.

20 Claims, 6 Drawing Sheets

INTEGRATED CIRCUIT DEVICE, SIGNAL PROCESSING SYSTEM, ELECTRONIC DEVICE AND METHOD FOR CONFIGURING A SIGNAL PROCESSING OPERATING MODE

FIELD OF THE INVENTION

The field of this invention relates to an integrated circuit device, a signal processing system, an electronic device and a method for configuring a signal processing operating mode.

BACKGROUND OF THE INVENTION

In the field of integrated circuit devices, and in particular in the field of application processor integrated circuit devices, modern integrated circuit devices are required to provide increasingly high performance, whilst concurrently they are required to meet increasingly stringent power consumption and thermal energy dissipation requirements.

It is known to implement multi-core architectures within integrated circuit devices in order to meet high performance requirements, such as a high maximum operating frequency requirement measured in mega instructions per second (MIPS). However, in practice, a typical use of such devices involves a processing rate that is significantly less than the maximum operating frequency requirements for the device. Accordingly, for a significant amount of the operating time of such devices, less than half the processing capacity is required.

It is known within a multi-core architecture, comprising two or more processing cores, to power down one or more of the processing cores when the processing load is sufficiently low to justify the reduction in system performance. However, it is also desirable to take advantage of any unused processing capacity in order to reduce the power consumption and thermal energy generation of such integrated circuit devices.

SUMMARY OF THE INVENTION

The present invention provides an integrated circuit device, a signal processing system, an electronic device and a method for configuring a signal processing operating mode, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
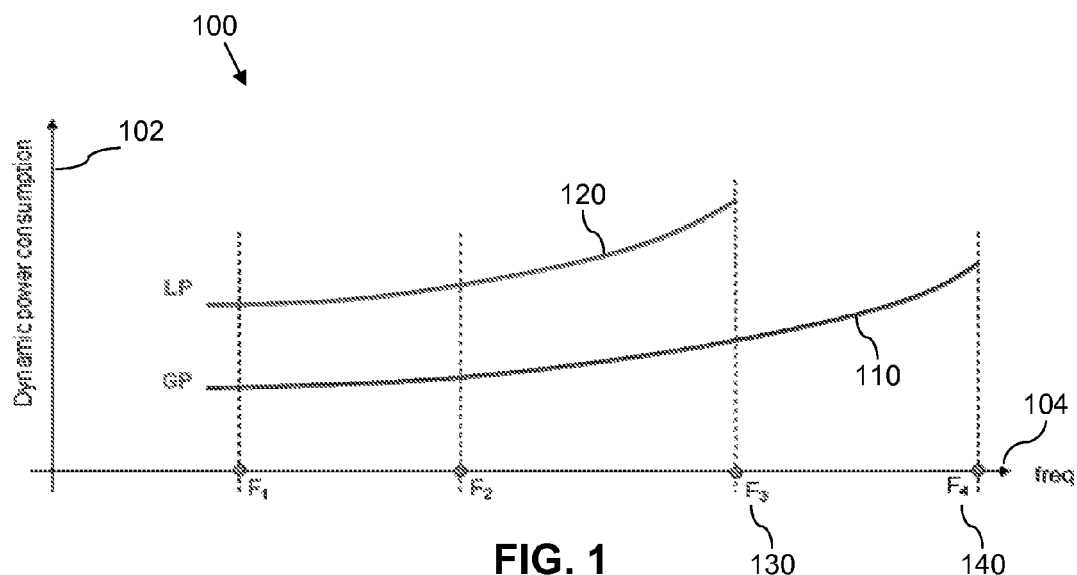
FIG. 1 illustrates a graph of dynamic power consumption versus operating frequency.

The present invention will now be described with reference to an integrated circuit device adapted in accordance with some examples of embodiments of the present invention. In particular, the present invention will be described with reference to a signal processing management module and signal processing modules located within a single integrated circuit device. However, it will be appreciated that the functional elements for providing the signal processing management module and the signal processing modules are not limited to being provided within a single integrated circuit device, but rather may, for example, be provided over a plurality of integrated circuit devices, or a number of discrete circuits and/or components.

Furthermore, because the illustrated examples may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In order to meet stringent performance requirements, whilst minimising power consumption, production processes used to fabricate circuit elements (for example transistors) used within such integrated circuit devices have been developed to produce circuit elements capable of operating at the desired high performance operating frequencies with lower supply voltage levels. In this manner, since the dynamic power consumption of circuit elements is to a large extent dependent upon both the supply voltage used to drive the circuits and the switching frequency therefor, the dynamic power consumption of such circuit elements is reduced for a given operating frequency. Similarly, such production processes enable increased performance for a given supply voltage.

Thus, such production processes may be considered as higher performance production processes, although often such higher performance production processes are referred to as 'general purpose' (GP) flavour processes.

A problem associated with using such higher performance production processes is that the circuit elements produced thereby often suffer from high power leakage. However, high power leakage is typically acceptable in high performance integrated circuit devices operating at high frequencies when dynamic power consumption techniques are applied to the high performance integrated circuit devices. However, for integrated circuit devices that are required to meet stringent power consumption and thermal energy dissipation requirements, but are not required to provide such high performances, this is an undesirable problem, since the benefit of being able to use dynamic power consumption decreases whilst the significance of the leakage power increases. Accordingly, it is known to use 'low power' (LP) flavour production processes to fabricate some integrated circuit devices, whereby the resulting circuit elements require a higher supply voltage to achieve a given operating frequency (resulting in higher dynamic power consumption), but which have a lower power leakage.

FIG. 1 illustrates a graph 100 of dynamic power consumption 102 versus operating frequency 104. The graph 100 comprises a first plot 110 illustrating an example of dynamic power consumption versus operating frequency for a first integrated circuit device fabricated using a higher performance production process, or GP flavour process (GP device). The graph 100 further comprises a second plot 120 illustrating an example of dynamic power consumption versus operating frequency for a second (comparable) integrated circuit device fabricated using a lower power production process, or LP flavour process (LP device).

An approximation of the dynamic power consumption ($P_D$) for a device may be given by the formula $P_D=C*V^2*f$, where C represents the total capacitance of the device, V represents the supply voltage for the device and f represents the operating frequency of the device. For the graph 100 of FIG. 1, the capacitance of each device remains constant, whilst the voltage and frequency vary. In particular, it is assumed for the graph of FIG. 1 that the supply voltage (V) is scaled according to the operating frequency.

As previously mentioned, devices fabricated using an LP flavour process require a higher supply voltage to achieve a given operating frequency than devices fabricated using a GP flavour process. Accordingly, and as illustrated in FIG. 1, the dynamic power consumption for the LP device 110 is higher for a given operating frequency that the dynamic power consumption for the GP device 120. Furthermore, due to maximum supply voltage limitations, the LP device is limited to a maximum operating frequency $F_3$ 130, whilst the GP device is capable of a higher maximum operating frequency $F_4$ 140.

Thus, it can be seen from the graph of FIG. 1 that, where dynamic power consumption and performance are the predominant requirements for a device, a higher performance, or GP flavour, production process, provides more suitable devices.

An approximation of the leakage power ($P_L$) for a device may be given by the formula $P_L=f(p, V, T)$, where f represents the operating frequency, p represents production process parameters, V represents the supply voltage, and T represents temperature.

Figure 2:
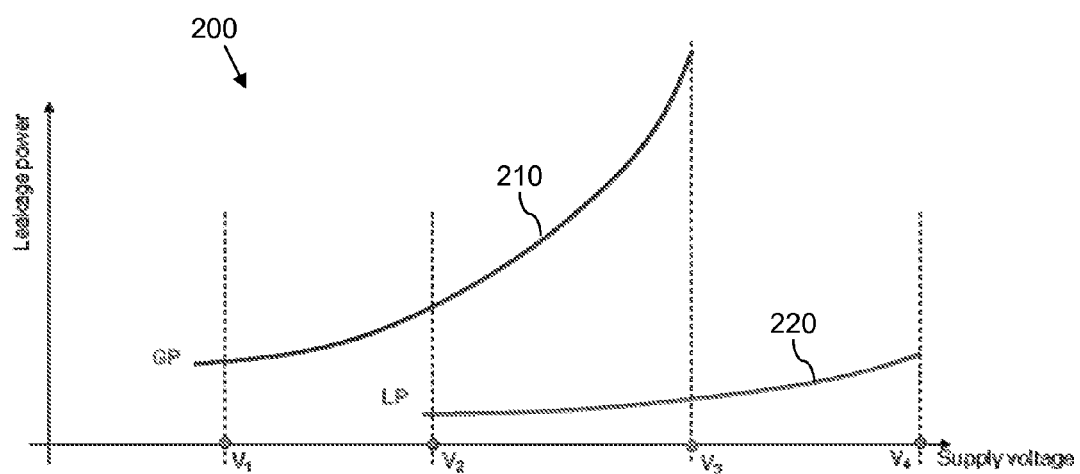
FIG. 2 illustrates a graph of leakage power versus supply voltage.

FIG. 2 illustrates a graph 200 of leakage power versus supply voltage. The graph 200 comprises a first plot 210 illustrating an example of leakage power versus supply voltage for a first integrated circuit device fabricated using a higher performance (GP flavour) production process (yielding a GP device). The graph 200 further comprises a second plot 220 illustrating an example of leakage power versus supply voltage for a second (comparable) integrated circuit device fabricated using a lower power (LP flavour) production process (yielding a LP device). As can be seen, whilst the GP device 210 typically operates over a lower range of supply voltages than the LP device 220 for a given range of operating frequencies, the GP device 210 has a significantly higher leakage power than the LP device 220. Furthermore, the leakage power for the GP device 210 becomes increasingly significant as the supply voltage increases.

Figure 3:
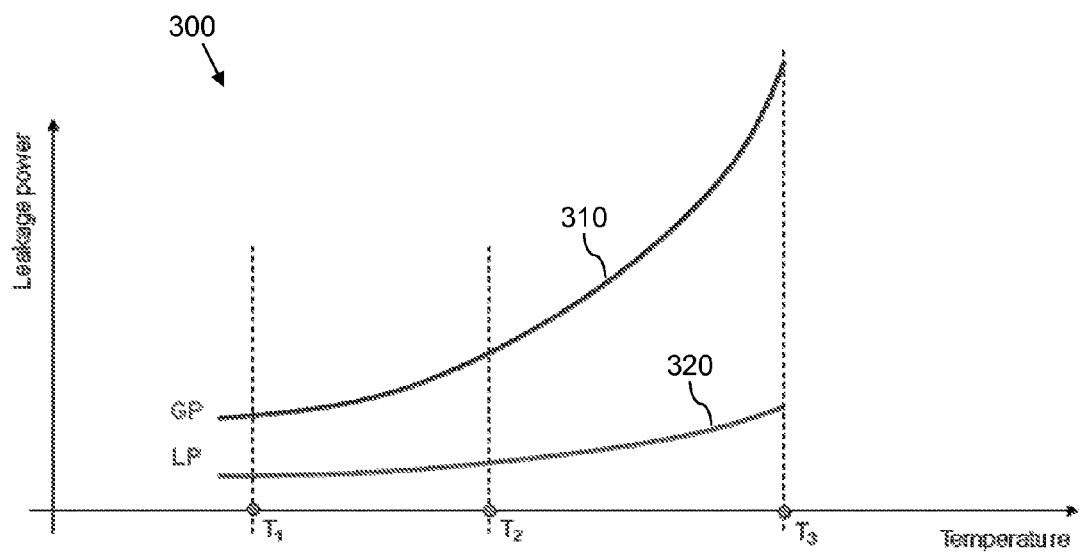
FIG. 3 illustrates a graph of leakage power versus temperature.

FIG. 3 illustrates a graph 300 of leakage power versus temperature. The graph 300 comprises a first plot 310 illustrating an example of leakage power versus temperature for a first integrated circuit device fabricated using a higher performance (GP flavour) production process (yielding a GP device). The graph 300 further comprises a second plot 320 illustrating an example of leakage power versus temperature for a second (comparable) integrated circuit device fabricated using a lower power (LP flavour) production process (yielding a LP device). As can be seen, whilst the leakage power for both the GP device 310 and the LP device 320 increases with increases in temperature, the leakage power for the GP device 320 increases at a far greater rate than that for the LP device 310.

Figure 4:
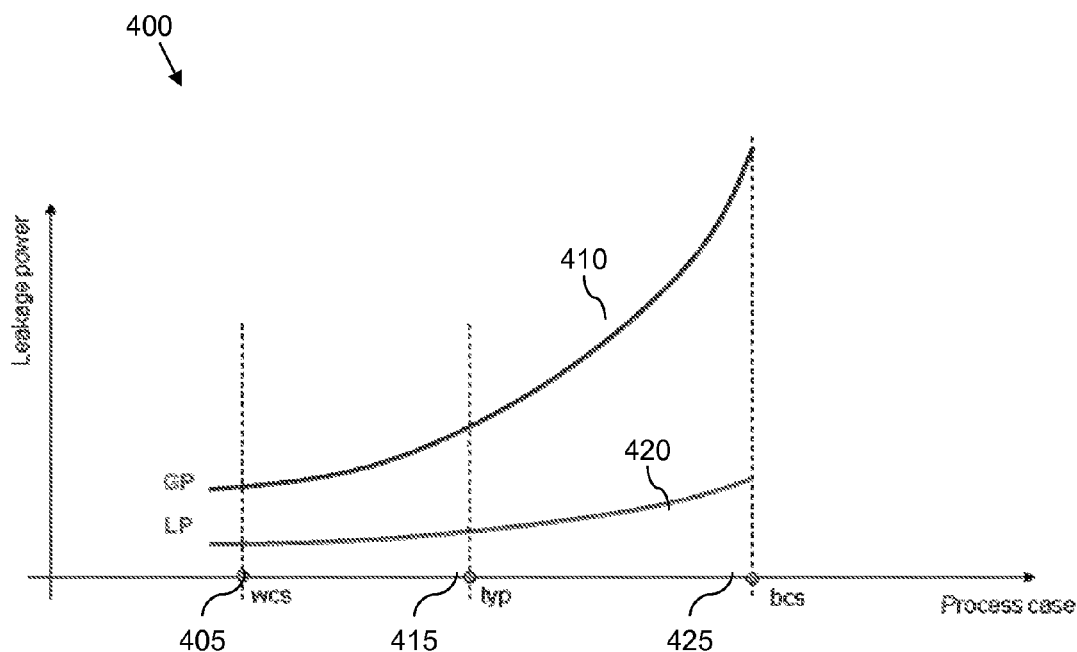
FIG. 4 illustrates a graph of leakage power versus process parameters.

FIG. 4 illustrates a graph 400 of leakage power versus process parameters, where the various process parameters for a device are collectively grouped into one of three commonly known 'process cases', comprising for example, worst case (wcs), 405 typical case (typ) 415, and best case (bcs) 425. The graph 400 comprises a first plot 410 that illustrates an example of leakage power versus process cases for a first integrated circuit device fabricated using a higher performance (GP flavour) production process (yielding a GP device). The graph 400 further comprises a second plot 420 illustrating an example of leakage power versus temperature for a second (comparable) integrated circuit device fabricated using a lower power (LP flavour) production process (yielding a LP device). As can be seen, whilst the leakage power for both the GP device 410 and the LP device 420 increases from worst case (wcs), through typical case (typ), to best case (bcs) the leakage power for the GP device 420 is affected to a much greater extent than that for the LP device 410. For clarity, the term 'best case' is used herein to refer to the case with the 'fastest' transistors etc, and thus the best case performance, and conversely the term 'worst case' is used herein to refer to the case with the 'slowest' transistors etc, and thus the worst case performance.

Thus, it can be seen from FIG's 2 to 4 that the power leakage for a device is also strongly dependent upon various operating factors, including the supply voltage, temperature and production process parameters, and that the leakage power of devices fabricated using higher performance (GP flavour) production processes are particularly affected by such operating factors. Accordingly, the overall power consumption for a device, which comprises both the dynamic power consumption of that device and the power leakage for the device, is dependent on a variety of factors, significant among which are the production process used to fabricate the elements within the device, and operating conditions for the device, such as the temperature, the supply voltage, the operating frequency, the process case, etc.

Figure 5:
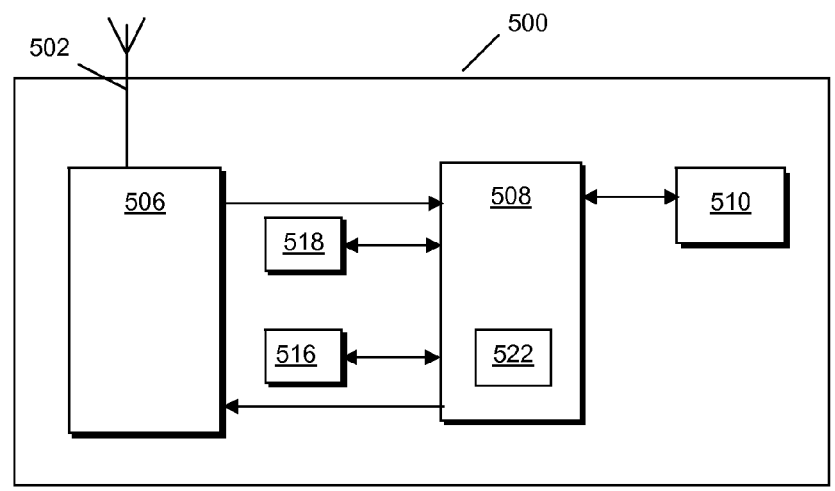
FIG. 5 illustrates an example of a simplified block diagram of part of an electronic device.

Referring to FIG. 5, there is illustrated an example of a simplified block diagram of part of an electronic device 500, such as may be adapted to support the inventive concept of an example of the present invention. The electronic device 500, in the context of the illustrated embodiment of the invention, is a communication unit in a form of a mobile telephone handset comprising an antenna 502. As such, the communication unit contains a variety of well known radio frequency components or circuits 506, operably coupled to the antenna 502 that will not be described further herein. The electronic device 500 further comprises signal processing module 500. An output from the signal processing module 508 is provided to a suitable user interface (UI) 510 comprising, for example, a display, keypad, microphone, speaker etc. Typical signal processing modules used within electronic devices such as the communication unit 500 are on the one hand required to provide increasingly high performance whilst on the other hand required to fulfil increasingly stringent power consumption and thermal energy dissipation requirements. For completeness, the signal processing module 508 is coupled to a memory element 516 that stores operating regimes, such as decoding/encoding functions and the like and may be realised in a variety of technologies such as random access memory (RAM) (volatile), (non-volatile) read only memory (ROM), Flash memory or any combination of these or other memory technologies. A timer 518 is typically coupled to the signal processing module 508 to control the timing of operations within the communication unit 500. In some examples of the invention, the signal processing module 508 has been adapted as hereinafter described.

Figure 6:
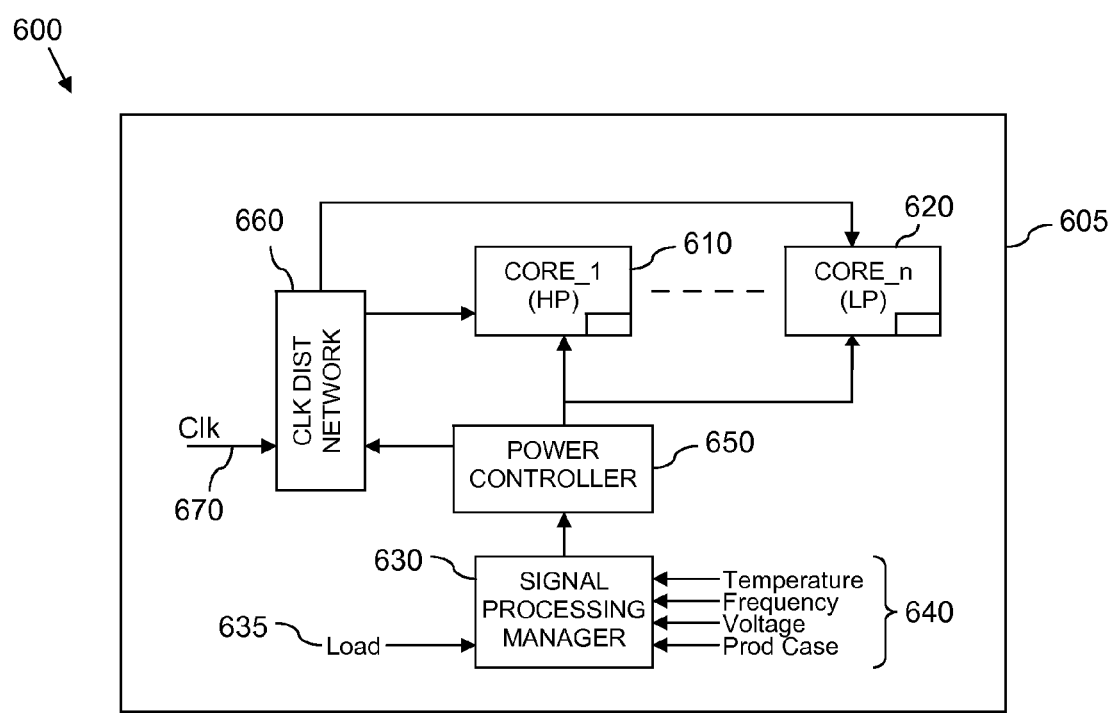
FIG. 6 illustrates an example of a signal processing system.

Referring now to FIG. 6, there is illustrated an example of a signal processing system 600, for example as may be used to implement the signal processing module 508 of FIG. 5. For the illustrated example, the signal processing system 600 is provided on a single integrated circuit device 605. However, the various functional and logical components of the signal processing system 600 may be distributed over any number of integrated circuit devices.

In accordance with some example embodiments of the invention, the signal processing system 600 comprises at least one first signal processing module fabricated by way of a first production process 610, for example by way of a higher performance production process (HP signal processing modules). The signal processing system 600 further comprises at least one second signal processing module fabricated by way of a second production process 620, wherein the second production process 620 is different to the first production process (610). For example, the second signal processing module may be fabricated by way of a lower power production process (LP signal processing modules). For the illustrated example, the one or more signal processing modules fabricated by way of the first production process are illustrated generally by way of HP processing core 610, and the one or more signal processing modules fabricated by way of the second production process are illustrated generally by way of LP processing core 620. The signal processing system 600 further comprises a signal processing management module 630. The signal processing management module 630 is arranged to determine a desired or required system performance (for example a desired or required mega instructions per second (MIPS) performance level or a required power consumption level), determine at least one operating condition of the signal processing system 600, and configure a signal processing operating mode for the signal processing modules 610, 620 based at least partly on the determined desired system performance, the at least one determined operating condition and at least one of the first production process 610 and the second production process 620.

In this manner, when the signal processing system 600 is required to operate at a higher performance level, for example during periods of high work load, or when processing tasks are required to be performed as quickly as possible or within strict time frames, the signal processing management module 630 may configure a signal processing operating mode whereby both the one or more signal processing modules fabricated by way of a first production process, which for the illustrated example comprises the HP processing core 610, and the one or more signal processing modules fabricated by way of a second production process, which for the illustrated example comprises the LP processing core 620, are powered up and executing processing tasks. However, when the signal processing system 600 is only required to operate at a reduced performance level, for example during periods of lower work load, or when reduced power consumption is of importance, the signal processing management module 630 may configure a signal processing operating mode whereby only one of the one or more signal processing modules fabricated by way of a first production process, which for the illustrated example comprises the HP processing core 610, or the one or more signal processing modules fabricated by way of a second production process, which for the illustrated example comprises the LP processing core 620, is powered down to reduce power consumption.

In practice a typical use of such signal processing systems involves employing a processing rate that is significantly less than the maximum performance for the device. Indeed, research has shown that the MIPS ratio between the maximum operating frequency requirement and a typical use-case can be 3:1 or higher. Accordingly, for a significant proportion of the operating time of such a system, one or more signal processing modules may be powered down, thereby enabling a significant reduction in power consumption.

Specifically, the signal processing management module 630 may be arranged to configure such a signal processing operating mode based not only on the required system performance, but also on one or more determined operating conditions such that a selection of the signal processing module(s) that is/are powered down may be made to provide an optimum balance between system performance in terms of MIPS and reduced power consumption. Accordingly, upon at least one of the determined required system performance(s) and the at least one determined operating condition meeting, say pre-defined criteria, for example a required MIPS value and/or a determined power consumption level being below a defined level, the signal processing management module 630 for the illustrated example may be arranged to select one of the HP processing core 610 and/or the LP processing core 620 to be powered down. In this manner, the powering down may, for example, be based on the determined operating condition(s) and the determined required system performance.

For the illustrated example, the signal processing management module 630 is arranged to receive one or more operating condition indication(s) illustrated generally at 640, and which for the illustrated example comprise a temperature indication, an operating frequency indication, a supply voltage indication and a production process case indication. Accordingly, the signal processing management module 630 may determine the one or more operating condition(s) based on which, it configures the signal processing operating mode using the received one or more operating condition indication(s) 640.

For example, the signal processing management module 630 is arranged to determine a required system performance. If such a determined required system performance indicates that a required MIPS level is sufficiently low for one or more of the processing cores 610, 620 to be powered down, the signal processing management module 630 may be arranged to configure a signal processing mode whereby at least one of the GP processing core 610 or the LP processing core 620 is powered down. In particular, the signal processing management module 630 may be arranged to select the processing core to be powered down based at least partly on a temperature indication, and to configure the signal processing operating mode accordingly. For example, the signal processing management module 630 may be arranged to configure the GP processing core, which has been fabricated by way of a higher performance production process, to be powered down when the received temperature indication indicates a higher temperature. Conversely, the signal processing management module 630 may be arranged to configure the LP processing core, which has been fabricated by way of a lower power production process, to be powered down when the received temperature indication indicates a lower temperature. In this manner, at higher temperatures when power leakage is increased (as illustrated in FIG. 3), and in particular when power leakage is significantly increased for integrated circuit elements fabricated by way of a higher performance production process, the GP processing core 610 may be powered down to avoid the higher power leakage of the GP processing core 610 and thereby achieve optimal power consumption reductions. Conversely, at lower temperatures when power leakage is of less significance, the LP processing core 620 may be powered down to maintain the higher performance of the GP processing core 610.

In one example, the production process used to fabricate the elements of an integrated circuit device and temperature are not the only factors that affect the leakage power, and thereby the total power consumption, of integrated circuit devices. As illustrated in FIG. 4, the production process case for the integrated circuit device 605 may also affect the power leakage of the various components of the device. Accordingly, the signal processing management module 630 may be further arranged to select one of the signal processing cores 610, 620 to be powered down based at least partly on a production process indication. For example, such a production process indication may be determined during post production of the integrated circuit device 605, and stored in, say, fuses or the like. In this manner, when the integrated circuit device 605 is indicated as comprising, say, a best case (bcs) for its production process, the signal processing management module 630 may be biased towards configuring the GP processing core 610 to be power down. Conversely, when the integrated circuit device 605 is indicated as comprising, say, a worst case (wcs) for its production process, the signal processing management module 630 may be biased towards configuring the LP processing core 620 to be powered down. However, when the integrated circuit device is indicated as comprising, say, a typical case (typ) for its production process case, the signal processing management module (630) may be more evenly biased between configuring the GP processing core 610 and the GP processing core 610 to be powered down. In one example, the signal processing management module 630 may be arranged to select which signal processing core(s)/module(s) to power down based at least partly on the production process for the integrated circuit device 605 in combination with one or more other factors, for example temperature, as described above.

As illustrated in FIG. 2, the power leakage, and thereby the total power consumption, of an integrated circuit device is further affected by factors such as supply voltage. Accordingly, it is contemplated that the signal processing management module 630 may be arranged to configure which signal processing core(s)/module(s) is/are to be powered down based at least partly on a supply voltage for the integrated circuit device 605. Additionally/alternatively, since a supply voltage for an integrated circuit device is typically scaled according to an operating frequency therefor, the signal processing management module 630 may be arranged to configure which signal processing core(s)/module(s) is/are to be powered down based at least partly on an operating frequency of the integrated circuit device 605.

Thus, for some examples the signal processing management module 630 may be arranged to configure a signal processing operating mode, based on a desired or required system performance, an operating condition of the signal processing system 600 and a particular production process of one or more of the signal processing cores. The operating condition of the signal processing system 600 may comprise one or more from a group consisting of:
 (i) an ambient or system temperature;
 (ii) a supply voltage; and
 (iii) an operating frequency.

A desired or required system performance for the signal processing system 600 may be determined by any suitable manner. For example, and as illustrated in FIG. 6, the signal processing management module 630 may be arranged to receive an indication of a signal processing load 635 for the currently active (i.e. powered up) signal processing core(s)/module(s) 610, 620. Alternatively, the signal processing management module 630 may be arranged to receive an indication of a required MIPS capacity, for example as set by an application program (not shown) running on the signal processing system 600.

The processing capacity of a signal processing module 610, 620 may also be affected by the operating frequency therefor. Accordingly, the signal processing management module 630 may be arranged to take into consideration factors such as the operating frequency of the signal processing core(s)/modules 610, 620 and/or their supply voltage from a point of view of processing capacity (e.g. achievable MIPS).

For the illustrated example, the integrated circuit device 605 comprises a power control module 650 arranged to control power supplies to the signal processing core(s)/modules 610, 620. For example, the power control module 650 may be operably coupled to power gating components (not shown) such as transistors, and arranged to configure the power gating components to gate (decouple) or un-gate (couple) voltage supplies to the respective signal processing core(s)/modules 610, 620 as required. The signal processing management module 630 is operably coupled to the power control module 650 and arranged to cause the power control module 650 to configure power supplies to the signal processing core(s)/module(s) 610, 620 in accordance with a configured signal processing operating mode. Furthermore for the illustrated example, the power control module 650 is operably coupled to a clock distribution network 660 arranged to receive one or more clock signals 670, and to adapt and distribute the clock signal(s) to the various functional and logical elements within the signal processing system 600 as required, and is arranged to configure the clock distribution network 670 to disable (for example by way of clock gating) clock signals to powered down signal processing modules. In this manner, power is not unnecessarily consumed in driving such clock signals.

Figure 7:
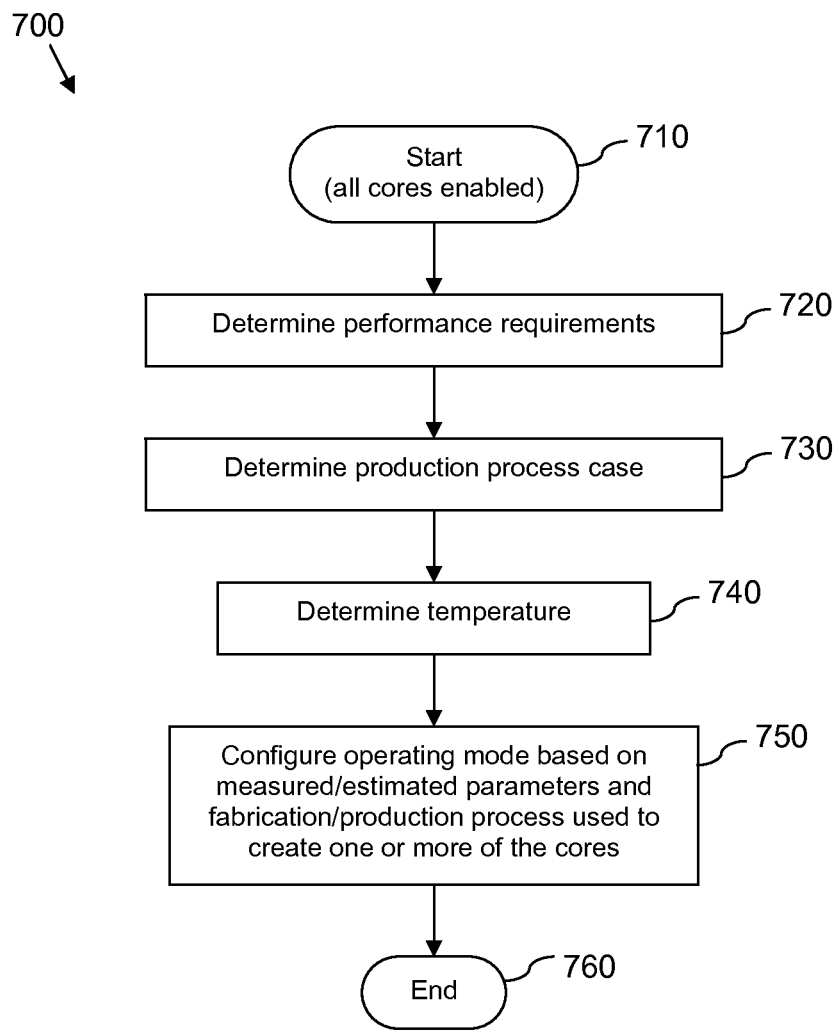
FIG. 7 illustrates a simplified flowchart of an example of a method for configuring a signal processing system.

Referring now to FIG. 7, there is illustrated a simplified flowchart 700 of an example of a method for configuring a signal processing system comprising at least one signal processing module fabricated by way of a first production process according to some embodiments of the present invention, for example a higher performance production process, and at least one signal processing module fabricated by way of a second production process, for example a lower power production process.

The method starts at step 710, where one or more signal processing modules are powered up and enabled. The method then moves on to step 720 where a required system performance is determined. For example, the required system performance may be determined based on measurements/estimates of, say, signal processing load etc. Next one or more operating conditions are determined, which for the illustrated example comprises determining a production process at step 730 and an ambient or system temperature at step 740. The method then moves on to 750 where a signal processing operating mode is configured based at least partly on the determined desired or required system performance and the at least one determined operating condition of the signal processing system and a fabrication/production process used to create one or more of the signal processing cores, for example as previously described. The method then ends at step 770. Alternatively, it is contemplated that after step 760, the method may loop back to step 720 and repeatedly re-configure the signal processing operating mode in accordance with changes in the required system performance and/or operating conditions.

Figure 8:
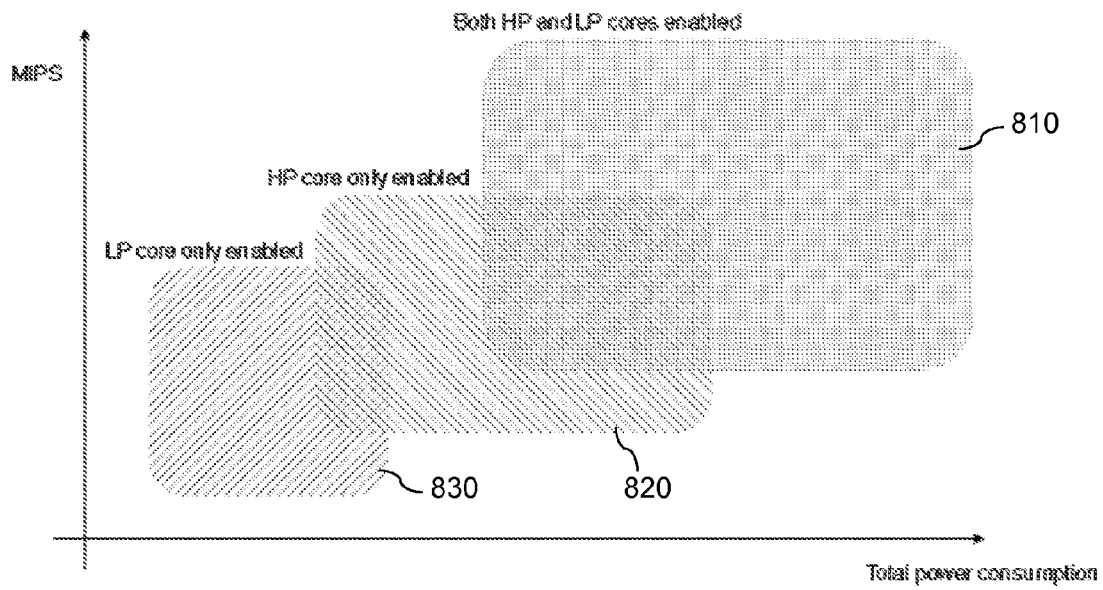
FIGS. 8 and 9 illustrate graphs showing examples of system performance against power consumption for signal processing operating modes.

Referring now to FIG. 8, there is illustrated a graph showing examples of system performance (MIPS) against power consumption for different signal processing operating modes of the signal processing system 600 of FIG. 6. For the illustrated example, the signal processing system comprises three signal processing operating core(s)/modes. A first signal processing operating mode comprises both signal processing modules 610, 620 being powered up and enabled. The performance/power consumption profile for this first signal processing operating mode is illustrated at 810. A second signal processing operating mode comprises the signal processing module fabricated by way of higher performance production processes, for example, HP processing core 610 of FIG. 6, being powered up and enabled, whilst the signal processing module fabricated by way of lower power production processes, LP processing core 620, being powered down. The performance/power consumption profile for this second signal processing operating mode is illustrated at 820. A third signal processing operating mode comprises the signal processing module fabricated by way of lower power production processes, LP processing core 620 being powered up and enabled, whilst the signal processing module fabricated by way of higher performance production processes, HP processing core 610, being powered down. The performance/power consumption profile for this third signal processing operating mode is illustrated at 830.

Figure 9:
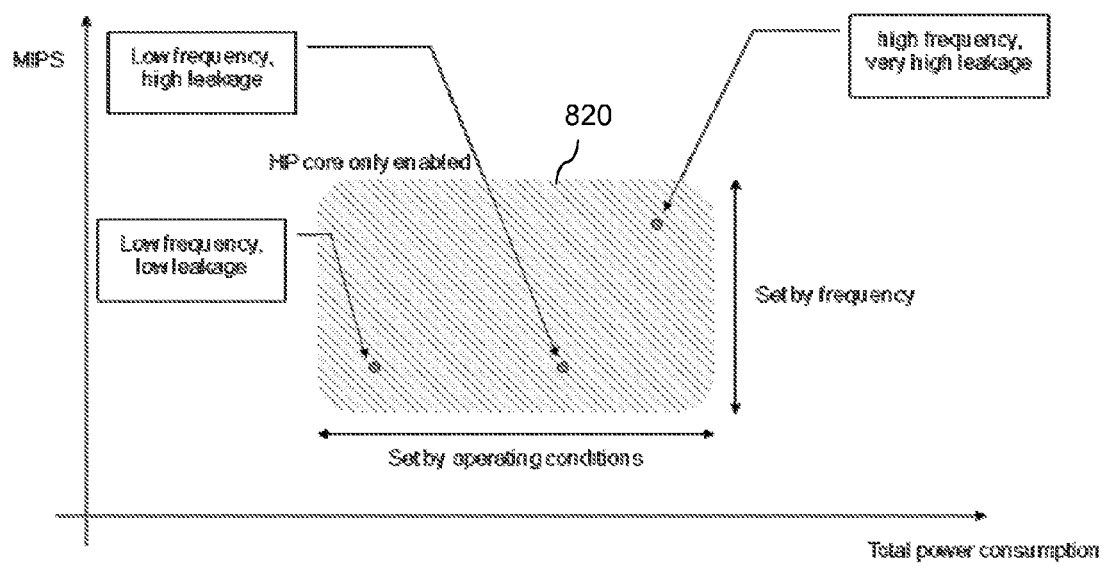

FIG. 9 illustrates performance/power consumption profile 820 for the second signal processing operating mode in more detail. As illustrated in FIG. 9, the performance for a signal processing operating mode is predominantly dependent on the operating frequency of the active signal processing module(s), which for the profile 820 illustrated in FIG. 9 comprises HP processing core 610 of FIG. 6. The power consumption for a particular signal processing operating mode is predominantly dependent upon the one or more operating conditions, such as temperature, supply voltage, production process case, etc. Accordingly each signal processing operating mode is capable of achieving a range of processing performance, depending upon the operating frequencies of the relevant signal processing modules. In addition, the power consumption of each signal processing module, and thereby of the respective signal processing operating modes, may vary depending on the one or more operating conditions. Thus, the signal processing management module 630 of FIG. 6 may be arranged to determine a required performance, and to identify one or more signal processing operating modes capable of achieving the required performance (taking into consideration operating frequencies). For example, information corresponding to the performance/power consumption profiles for the signal processing operating modes may be stored within one or more lookup tables, accessible by the signal processing management module 630 of FIG. 6. Having identified one or more suitable signal processing operating modes, the signal processing management module 630 may then be arranged to determine which of the identified signal processing operating modes is likely to provide the lowest power consumption, taking into consideration the one or more operating conditions. The signal processing management module 630 may then configure the signal processing operating mode accordingly.

Figure 10:
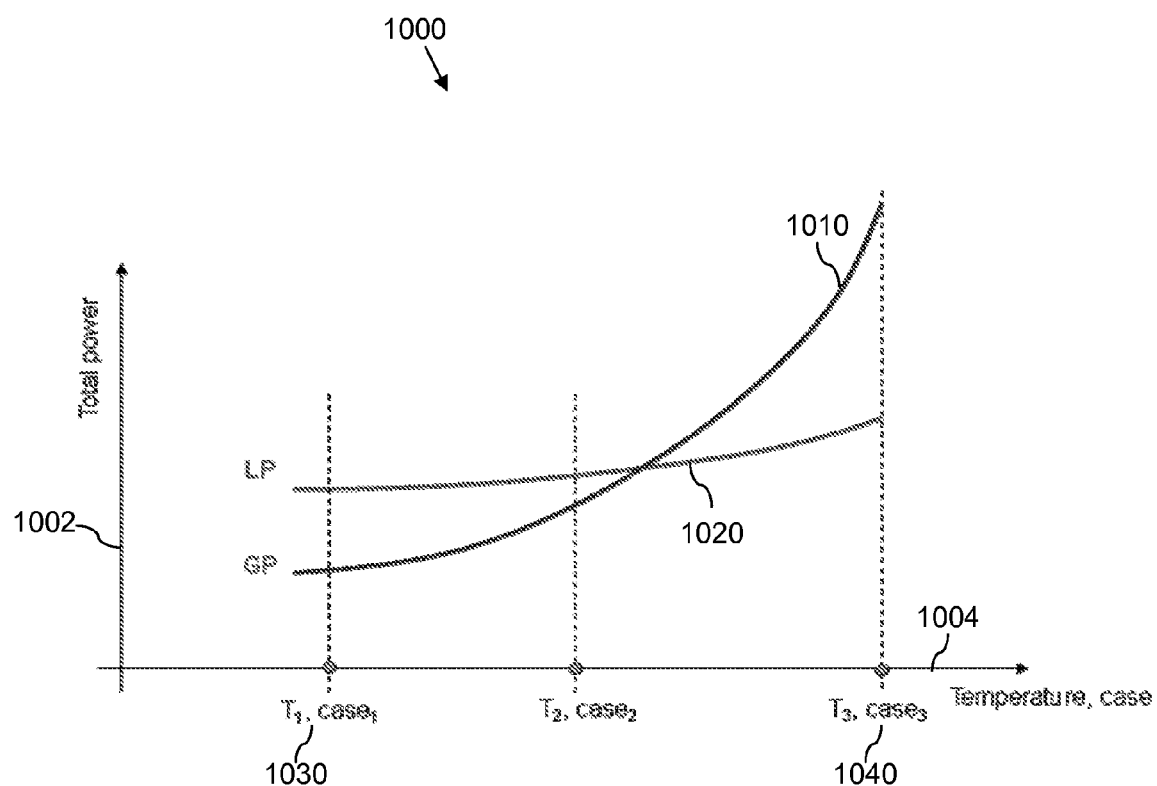
FIG. 10 illustrates a graph of total power consumption (dynamic and leakage) versus temperature and case dependency.

Referring now to FIG. 10, there is illustrated a graph 1000 of total power consumption (dynamic and leakage) 1002 versus temperature and case dependency 1004. The graph 1000 comprises a first plot 1010 illustrating an example of total power consumption versus temperature and case dependency for a first signal processing module fabricated using a higher performance production process, or GP flavour process (yielding a GP device). The graph 1000 further comprises a second plot 1020 illustrating an example of total power consumption versus temperature and case dependency for a second (comparable) signal processing module fabricated using a lower power production process, or LP flavour process (yielding a LP device). For the graph of FIG. 10, the operating frequencies for the signal processing modules may be assumed to be substantially equal and constant, with substantially constant supply voltages. As can be seen, in a scenario comprising a low temperature and process case dependency (e.g. a wcs process case at a low temperature), illustrated generally at 1030, the total power consumption of the GP device is significantly lower than that of the LP device. This is due to the relatively high dynamic power consumption of the LP device, and the relatively low power leakage of the GP device under these conditions. However, in a scenario comprising a high temperature and process case dependency (e.g. a bcs process case at a high temperature), illustrated generally at 1040, the total power consumption of the GP device is now significantly higher that that of the LP device. This is due to a significant increase in the power leakage of the GP device caused by the temperature and process case conditions.

Thus, it can be seen from the graph of FIG. 10 that a significant reduction in power consumption may be achieved by appropriate selection of signal processing modules based on operating conditions such as temperature and process case.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, electrically erasable programmable read only memory (EEPROM), electrically programmable read only memory (EPROM), read only memory (ROM); ferromagnetic digital memories; magnetic random access memory (MRAM); volatile storage media including registers, buffers or caches, main memory, random access memory (RAM), etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, for the example illustrated in FIG. 6, the power control module 650 is illustrated as comprising a separate functional block to the signal processing management module 630. However, it is contemplated that for some alternative embodiments the power control module 650 may form an integral part of the signal processing management module 630.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment and as illustrated in FIG. 6, a signal processing system adapted in accordance with the present invention may be implemented as circuitry located on a single integrated circuit or within a same device. Alternatively, some examples may be implemented as any number of separate integrated circuits or separate devices interconnected with each other in a suitable manner. Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'. For example, examples may be implemented in a tangible computer program product having executable program code stored therein for configuring a signal processing operating mode for a signal processing system. The signal processing system may comprise at least one first signal processing module fabricated by way of a first production process and at least one second signal processing module fabricated by way of a second production process, wherein the second production process is different to the first production process. In this regard, the program code may be operable for, when executed on the signal processing system: determining a desired system performance; determining at least one operating condition of the signal processing system; and configuring a signal processing operating mode of the signal processing system based at least partly on: the determined desired system performance; the at least one determined operating condition; and at least one of the first production process and the second production process.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An integrated circuit device comprising a signal processing system comprising:
   a first signal processing module fabricated by way of a first production process;
   a second signal processing module fabricated by way of a second production process, wherein the second production process is different from the first production process, and wherein the first and second production processes are used to fabricate the elements of the integrated circuit device; and
   a signal processing management module arranged to determine a desired system performance of the integrated circuit device, to determine an operating condition of the signal processing system, and to configure a signal processing operating mode of the signal processing system based on the desired system performance, the operating condition, one of the first production process and the second production process, and a production process indication determined for the first and second production processes and determined after the production of the integrated circuit device.

2. The integrated circuit device of claim 1 wherein the signal processing management module further configures the signal processing operating mode of:
   the first signal processing module based on the production process indication for the first production process; and
   the second signal processing module based on the production process indication for the second production process, wherein the production process indication is stored in the integrated circuit device.

3. The integrated circuit device of claim 2 wherein, based upon one of the desired system performance and the operating condition meeting a defined criteria, the signal processing management module further configures the signal processing operating mode by powering down the first signal processing module.

4. The integrated circuit device of claim 1 wherein the first signal processing module is fabricated by way of a higher performance production process and the second signal processing module is fabricated by way of a lower power production process.

5. The integrated circuit device of claim 1 wherein the signal processing management module further receives an operating condition indication comprising one of:
   a temperature indication;
   an operating frequency indication; and
   a supply voltage indication.

6. The integrated circuit device of claim 5 wherein the signal processing management module further powers down the first signal processing module based on one of the temperature indication, the operating frequency indication, and the supply voltage indication.

7. The integrated circuit device of claim 1 wherein the signal processing management module is coupled to a power control module, and wherein in configuring the signal processing operating mode, the signal processing management module is further arranged to direct the power control module to control a power supply to the first signal processing module and the second signal processing module.

8. The integrated circuit device of claim 1 wherein the signal processing management module further receives an indication of a signal processing load with which the signal processing management module determines the required system performance.

9. The integrated circuit device of claim 1 wherein the signal processing management module is further arranged to determine a production process associated with a measured leakage current for the integrated circuit device.

10. An electronic device comprising a signal processing system comprising:
    a first signal processing module fabricated by way of a first production process;
    a second signal processing module fabricated by way of a second production process, wherein the second production process is different to the first production process, and wherein the first and second production processes are used to fabricated the elements of the electronic device; and
    a signal processing management module,
    wherein the signal processing management module determines a desired system performance of the electronic device, determines an operating condition of the signal processing system, and configures a signal processing operating mode of the signal processing system based on the desired system performance, the operating condition, one of the first production process and the second production process, and a production process indication for the first and second production processes determined after the production of the electronic device.

11. The electronic device of claim 10 wherein the first signal processing module is fabricated by way of a higher performance production process and the second signal processing module is fabricated by way of a lower power production process.

12. The electronic device of claim 10 wherein the signal processing management module further receives an operating condition indication comprising one of:
    a temperature indication;
    an operating frequency indication;
    a supply voltage indication;
    a production process indication.

13. The electronic device of claim 10 wherein the signal processing management module is coupled to a power control module and further configures the signal processing operating mode of the signal processing system by controlling a power supply to the first signal processing module and the second signal processing module.

14. The electronic device of claim 10 wherein production process indication indicates that the electronic device fabrication was one of a best case for the first and second production process, a typical case for the first and second production process, and a worst case for the first and second production process, and wherein the production process indication is stored in the integrated circuit device.

15. A method for configuring a signal processing operating mode for a signal processing system comprising a first signal processing module fabricated by way of a first production process, and a second signal processing module fabricated by way of a second production process, wherein the first production process provides a first leakage current based upon an applied voltage and operating frequency and the second production process provides a second leakage current based upon the applied voltage and operating frequency, the first leakage current being different to the second leakage current, the method comprising:
    determining a desired system performance;
    determining an operating condition of the signal processing system; and
    configuring a signal processing operating mode of the signal processing system based on:
        the desired system performance;
        the operating condition; and
        a production process indication stored in the signal processing system for the first production process and the second production process, wherein the first and second production processes are used to fabricate the elements of an integrated circuit having the signal processing system and are determined after production of the integrated circuit.

16. The method of claim 15 further comprising;
    configuring the signal processing operating mode of the first signal processing module based on its fabrication by way of the first production process; and
    configuring the signal processing operating mode of the second signal processing module based on its fabrication by way of the second production process.

17. The method of claim 15 wherein the first signal processing module is fabricated by way of a higher performance production process and the second signal processing module is fabricated by way of a lower power production process.

18. The electronic device of claim 15 further comprising:
    receiving an operating condition indication comprising one of:
        a temperature indication;
        an operating frequency indication;
        a supply voltage indication;
        a production process indication.

19. The method of claim 18 further comprising:
    powering down one of the first signal processing module and the second signal processing module based on one of: the temperature indication, the operating frequency indication, the supply voltage indication.

20. The method of claim 15 wherein the signal processing management module is coupled to a power control module, the method further comprising:
    configuring the signal processing operating mode of the signal processing system by controlling a power supply to the first signal processing module and the second signal processing module.

* * * * *